US012638116B2

(12) United States Patent
Matsui et al.

(10) Patent No.: US 12,638,116 B2
(45) Date of Patent: May 26, 2026

(54) TUBE JOINT

(71) Applicant: Panasonic Holdings Corporation, Osaka (JP)

(72) Inventors: Shigeyoshi Matsui, Osaka (JP); Toshihiko Matsuda, Fukuoka (JP)

(73) Assignee: PANASONIC PROJECTOR & DISPLAY CORPORATION, Osaka (JP)

( * ) Notice: Subject to any disclaimer, the term of this patent is extended or adjusted under 35 U.S.C. 154(b) by 0 days.

(21) Appl. No.: 19/020,495

(22) Filed: Jan. 14, 2025

(65) Prior Publication Data

US 2025/0146609 A1      May 8, 2025

Related U.S. Application Data

(63) Continuation of application No. PCT/JP2023/026313, filed on Jul. 18, 2023.

(30) Foreign Application Priority Data

Jul. 25, 2022    (JP) ................................. 2022-118116

(51) Int. Cl.
*F16L 37/248* (2006.01)
*F16L 37/138* (2006.01)
(Continued)

(52) U.S. Cl.
CPC ............. *F16L 37/248* (2013.01); *F16L 37/34* (2013.01); *F16L 37/138* (2013.01); *F16L 37/32* (2013.01)

(58) Field of Classification Search
CPC ..... F16L 37/248; F16L 37/107; F16L 37/138; F16L 37/24; F16L 37/32; F16L 37/34
See application file for complete search history.

(56) References Cited

U.S. PATENT DOCUMENTS

| | | | | |
|---|---|---|---|---|
| 5,482,083 A | * | 1/1996 | Jenski | |
| 6,237,631 B1 | * | 5/2001 | Giesler | ................... F16L 37/34 |

(Continued)

FOREIGN PATENT DOCUMENTS

| | | |
|---|---|---|
| CN | 210462080 | 5/2020 |
| JP | 56-23598 | 6/1981 |

(Continued)

OTHER PUBLICATIONS

International Search Report issued Oct. 3, 2023 in International (PCT) Application No. PCT/JP2023/026313.

*Primary Examiner* — William S. Choi
(74) *Attorney, Agent, or Firm* — Wenderoth, Lind & Ponack, L.L.P.

(57) ABSTRACT

A tube joint connecting two tubes includes a female connector having an insert receptacle recessed in an axial direction that is an insertion direction, and a male connector having an insert that projects out and that is inserted in the insert receptacle in the axial direction. The female connector further includes: a pressing member; an inner seal member; a spring; an outer peripheral member that is connected to one end of the spring, that is biased in a direction opposite to the axial direction, and that abuts against the inner seal member while the male connector is not inserted; a spring enclosure; an outer seal member that seals a gap between the female connector and the male connector while the male connector is inserted; and an annular member that covers the outer seal member and the spring enclosure.

14 Claims, 6 Drawing Sheets

20

(51) Int. Cl.
    *F16L 37/32*       (2006.01)
    *F16L 37/34*       (2006.01)

(56)               References Cited

U.S. PATENT DOCUMENTS

| | | | | |
|---|---|---|---|---|
| 6,681,803 | B2 * | 1/2004 | Taneya | F16L 37/34 |
| 7,766,393 | B2 * | 8/2010 | Tiberghien | F16L 37/138 |
| 8,985,131 | B2 * | 3/2015 | Cheon | F16L 37/248 |
| 11,566,736 | B2 * | 1/2023 | Truong | F16L 37/32 |
| 2007/0025811 | A1 * | 2/2007 | Wilhelm | F16L 37/34 |
| 2015/0001844 | A1 * | 1/2015 | Tiberghien | F16L 37/248 |

FOREIGN PATENT DOCUMENTS

| | | |
|---|---|---|
| JP | 63-6272 | 2/1988 |
| JP | 7-21977 | 5/1995 |
| JP | 2001-208221 | 8/2001 |
| JP | 5986389 | 9/2016 |

* cited by examiner

TUBE JOINT

TECHNICAL FIELD

The present disclosure relates to a tube joint including a male connector and a female connector that can be coupled to each other.

BACKGROUND ART

When an internal fluid flowing through a tube is a medium containing water, there is a problem that, at a low temperature, the volume expands as the medium freezes. Such a joint may become damaged or destroyed due to the pressure generated by the medium freezing with an expansion in volume.

Conventionally, there has been a disclosure pertinent to a joint for coupling two flowing medium enclosure elements, the joint being provided with a pressure equalizing chamber at a position between a first connection end and a second connection end, and a compressible insert disposed inside the pressure equalizing chamber, and in which the flowing medium flows between an inner wall of the pressure equalizing chamber and the compressible insert (see, for example, Japanese Patent No. 5986389). With this joint, a damage or a destruction of the joint at the time of freezing can be prevented because the compressible insert becomes compressed when the volume of the flowing medium expands, due to a cause in the temperature of the flowing medium.

However, the conventional joint not only needs to be provided with the pressure equalizing space for alleviating the volume expansion, but also requires the insert member having an appropriate hardness, and therefore, has had problems such as that the number of components and the size of the joint become increased. Such a joint therefore has not been suitable for an installation, attachment, or detachment in a limited space, e.g., for the use in a cooling pipe inside of an electronic device.

Furthermore, inside the electronic device, there is a requirement that any water leakage is not acceptable.

SUMMARY OF THE INVENTION

An object of the present disclosure is to provide a tube joint that is capable of suppressing an expansion of the tube joint in the radial direction, in a part where an outer seal member is installed, even when the volume of the internal fluid containing water expands as a result of freezing of the internal fluid.

A tube joint according to the present disclosure is a tube joint for connecting and coupling two tubes internals of which are configured to pass a fluid, the tube joint including: a female connector including a first tube an inner side of which the fluid flows, and an insert receptacle that is recessed in an axial direction that is an insertion direction; and a male connector including a second tube an inner side of which the fluid flows, and an insert that is protruding and that is to be inserted into and coupled to the insert receptacle in the axial direction. The female connector further includes: a pressing member disposed on an inner side of the insert receptacle; an inner seal member disposed around the pressing member; a spring disposed around the first tube; an outer peripheral member connected to one end of the spring, biased in a direction opposite to the axial direction by the spring, and abutting against the inner seal member while the male connector is not inserted in the insert receptacle; a spring enclosure that encloses the spring; an outer seal member that seals a gap between the female connector and the male connector when the male connector is inserted in the insert receptacle; and an annular member that covers the outer seal member and the spring enclosure. The outer seal member seals a gap between the outer peripheral member and the annular member while the male connector is not inserted in the insert receptacle. The annular member has a recess at a position between the outer seal member and the spring enclosure in the axial direction. The recess is recessed from an outer surface of the annular member in a radial direction of the annular member, along at least a part of a circumference of the annular member.

With the tube joint according to the present disclosure, a recess that is recessed is provided to the outer side in the radial direction of the annular member, between the outer seal member and the spring enclosure, along at least a part of the circumference of the annular member. Therefore, it is possible to provide a tube joint capable of suppressing the expansion in the radial direction, in the part where the outer seal member is installed, even when the volume of the internal fluid containing water expands, as the internal fluid freezes.

Figure 2:
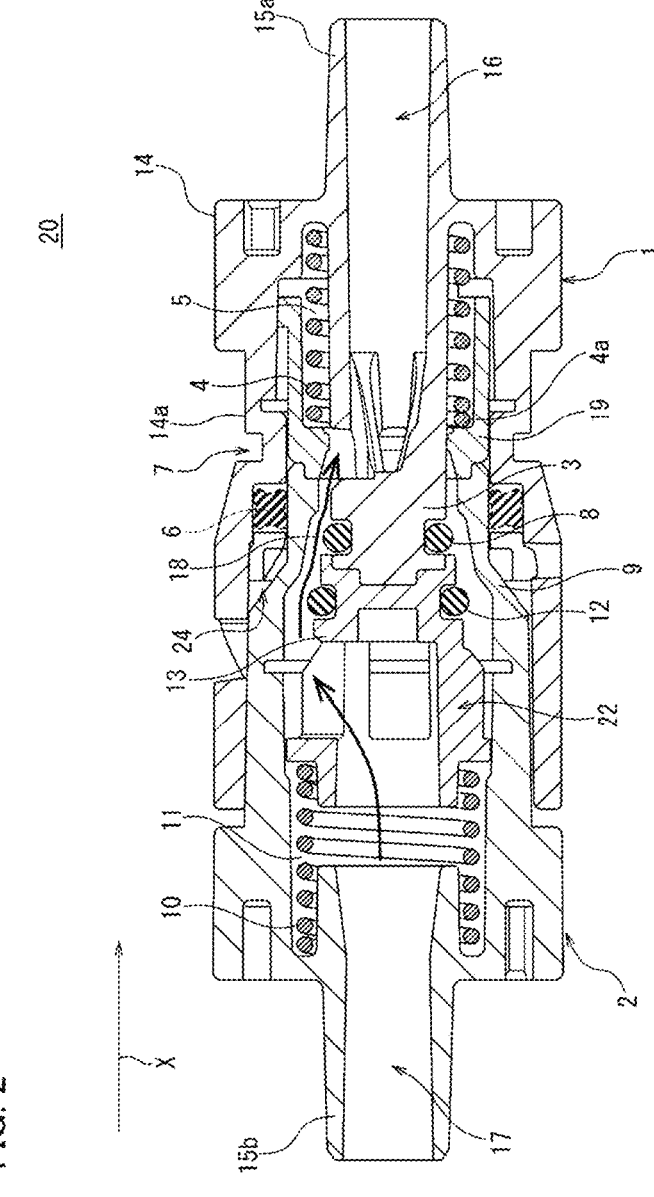
FIG. 2 is a cross-sectional view illustrating the tube joint in FIG. 1 in the opened state where the flow path is opened, as viewed from a direction perpendicular to an axial direction.
Figure 3:
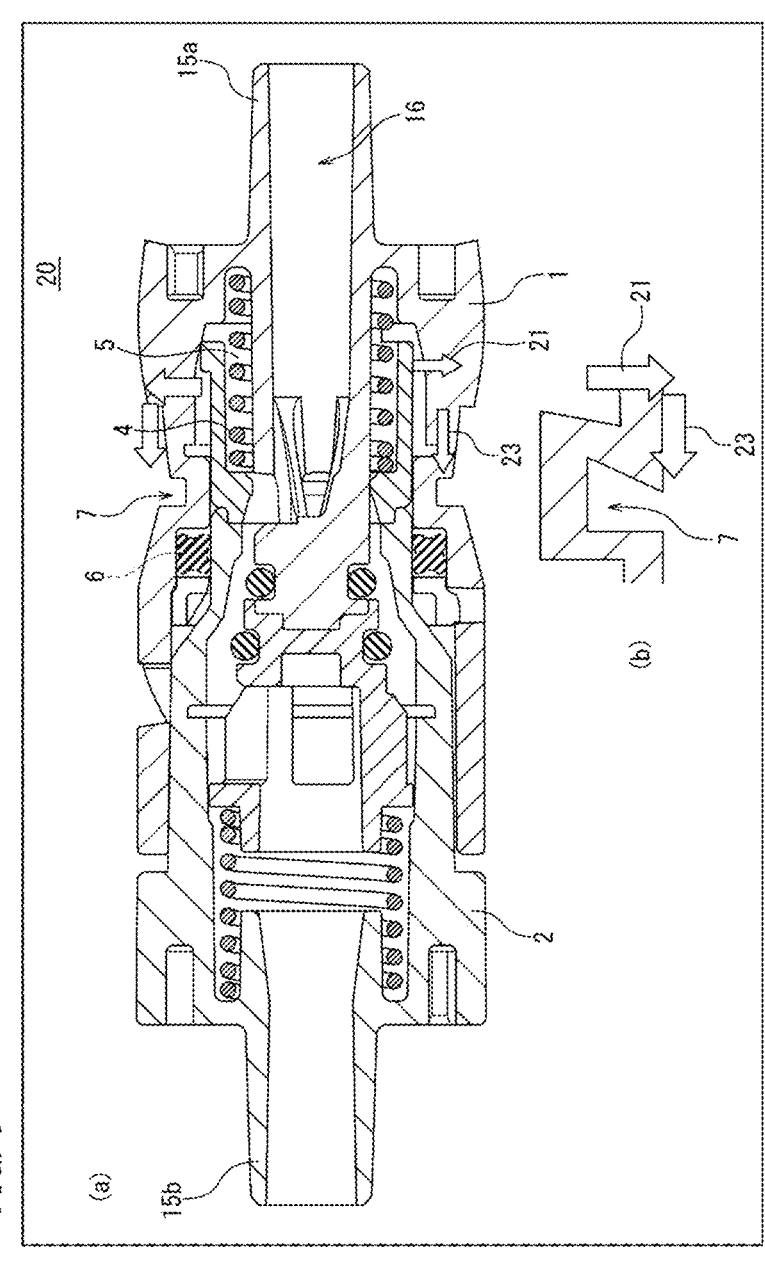

Part (a) of FIG. 3 is a schematic cross-sectional view illustrating how the first outer peripheral member deforms outwards in the radial direction, when the internal fluid flowing through the tube joint illustrated in FIG. 2 freezes and expands in volume, and pushes the first outer peripheral member from a first spring enclosure, and part (b) is a schematic diagram illustrating how an expansion of the first spring enclosure in the radial direction is converted into an axial deformation of a recess.

Figure 4:
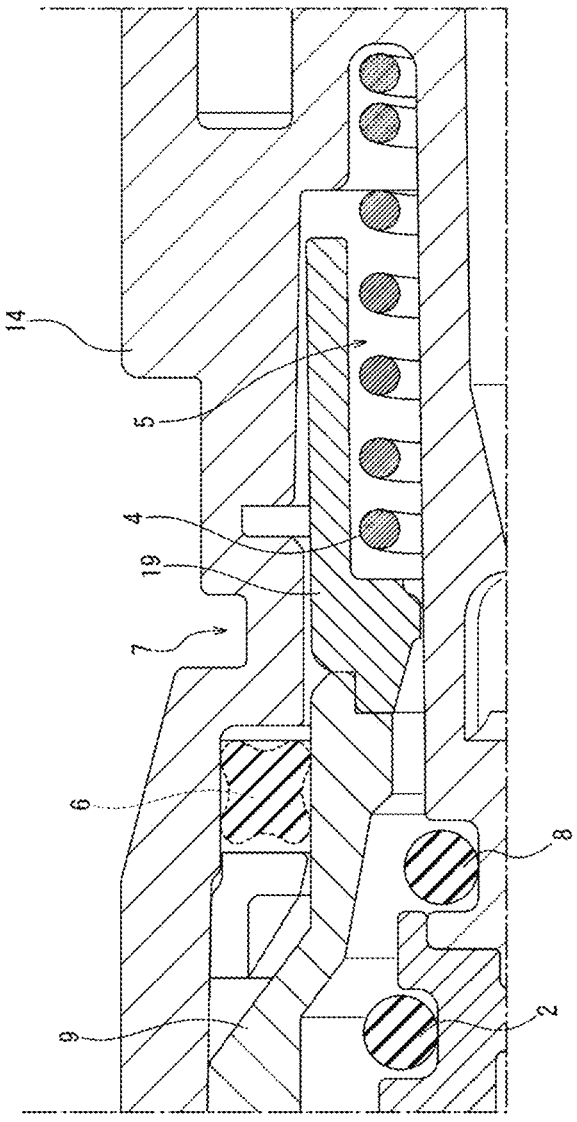

FIG. 4 is an enlarged cross-sectional view illustrating a first spring, a first spring enclosure, and a recess in the tube joint illustrated in FIG. 2.

Figure 5:
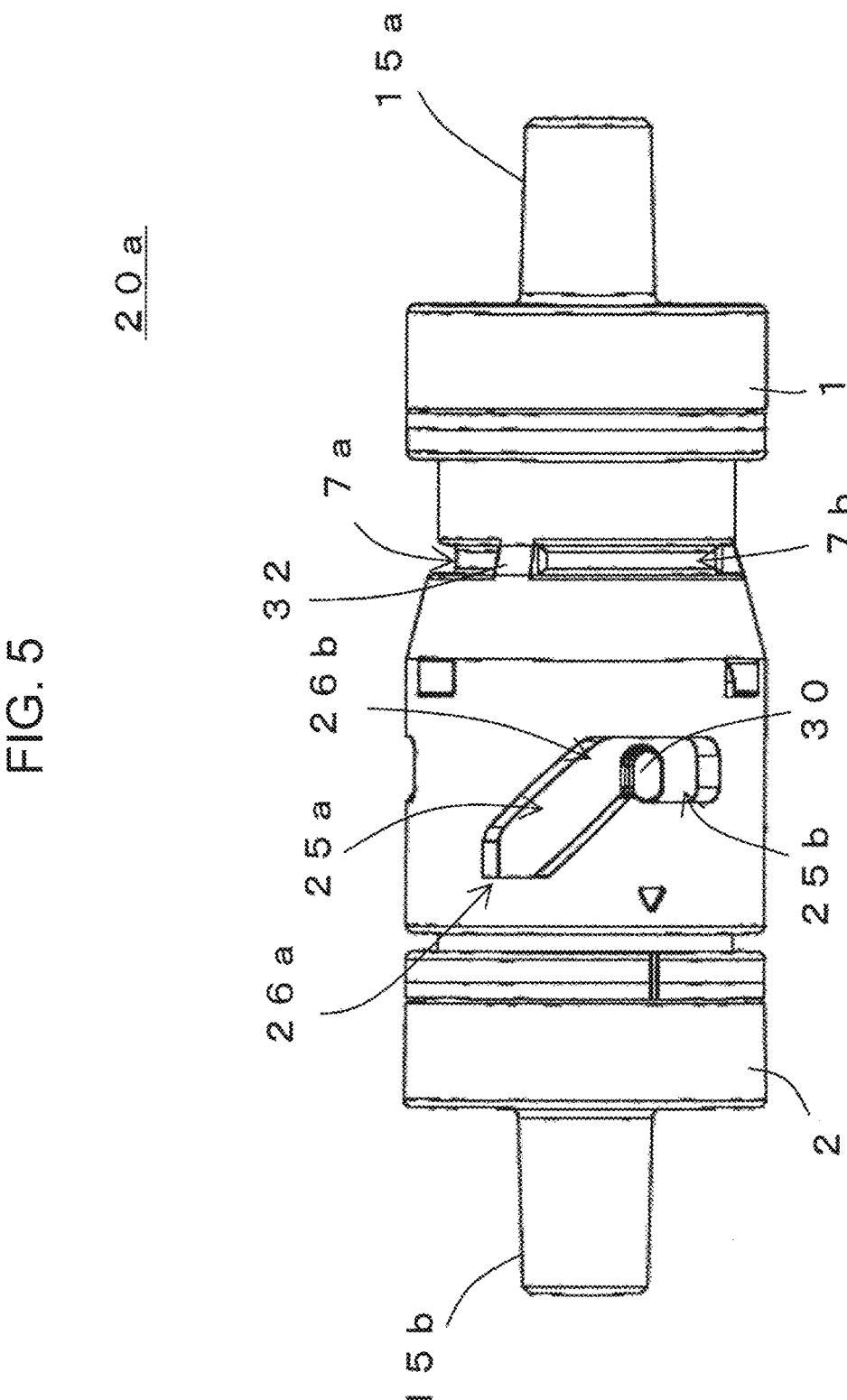

FIG. 5 is a schematic perspective view illustrating an outer appearance of a tube joint according to a second exemplary embodiment, in an opened state where the flow path of the tube joint is opened.

Figure 6:
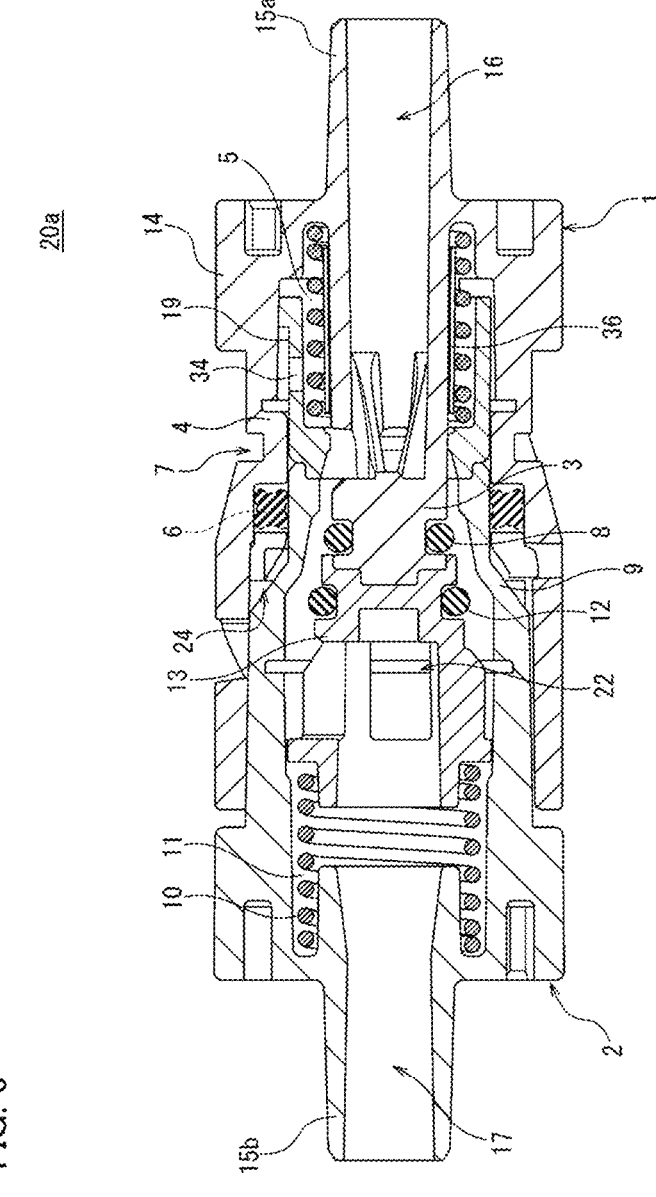

FIG. 6 is a cross-sectional view illustrating the tube joint in FIG. 5 in the opened state where flow path is opened, as viewed from a direction perpendicular to an axial direction.

DETAILED DESCRIPTION OF THE INVENTION

A tube joint according to a first aspect is a tube joint for connecting and coupling tubes internals of which are configured to pass a fluid, the tube joint including: a female connector having a first tube an inner side of which the fluid flows and having an insert receptacle that is recessed in an axial direction that is an insertion direction; and a male connector including a second tube an inner side of which the fluid flows, and an insert that is protruding and that is to be inserted into and coupled to the insert receptacle in the axial direction, in which the female connector includes: a pressing member having a seal member around the pressing member;

a spring having one end connected to the insert; an outer peripheral member connected to the other end of the spring, biased outwards in an axial direction, and abutting against the sealing member provided around the pressing member while the male connector is not inserted in the insert receptacle; a spring enclosure that encloses the spring; an outer seal member that seals a gap connected to outside by nipping the outer peripheral member with the pressing member while the male connector is not inserted in the insert receptacle, and seals a gap between the female connector and the male connector while the male connector is inserted in the insert receptacle; and an annular member that covers the outer seal member and the spring enclosure in the axial direction, in which the annular member is provided with a recess that is recessed, on an outer side in the radial direction of the annular member, between the outer seal member and the spring enclosure in the axial direction, along at least a part of a circumference of the annular member.

In a tube joint according to a second aspect, in the first aspect, the recess may be configured to deform in the axial direction when the spring enclosure expands.

In a tube joint according to a third aspect, in the first or second aspect, the recess may be provided at the same position in the axial direction, as one end of the spring enclosure.

In a tube joint according to a fourth aspect, in any one of the first to third aspects, the outer peripheral member may be provided with a corrugated portion, on an outer periphery of the outer peripheral member, and the annular member may have a corrugated shape, on an inner periphery of the annular member, the corrugated shape being a shape following a shape of the corrugated portion.

In any one of the first to fourth aspects, a tube joint according to a fifth aspect may further include a communicating hole communicating with an inner-periphery side of the annular member, the communicating hole being provided to an outer side of the spring enclosure in the radial direction.

A tube joint according to a sixth aspect may further include, in any one of the first to fifth aspects, a heat insulating material disposed on an inner side of the spring enclosure, in the radial direction.

In a tube joint according to a seventh aspect, in any one of the first to sixth aspects, the fluid may contain water.

In a tube joint according to an eighth aspect, in any one of the first to seventh aspects, the spring enclosure may be defined by the spring, the first tube that is on the inner peripheral side of the spring, and the outer peripheral member that is on the outer peripheral side of the spring.

A tube joint according to exemplary embodiments will now be described with reference to the accompanying drawings. In the drawings, substantially the same members are denoted by the same reference numerals.

First Exemplary Embodiment

Figure 1:
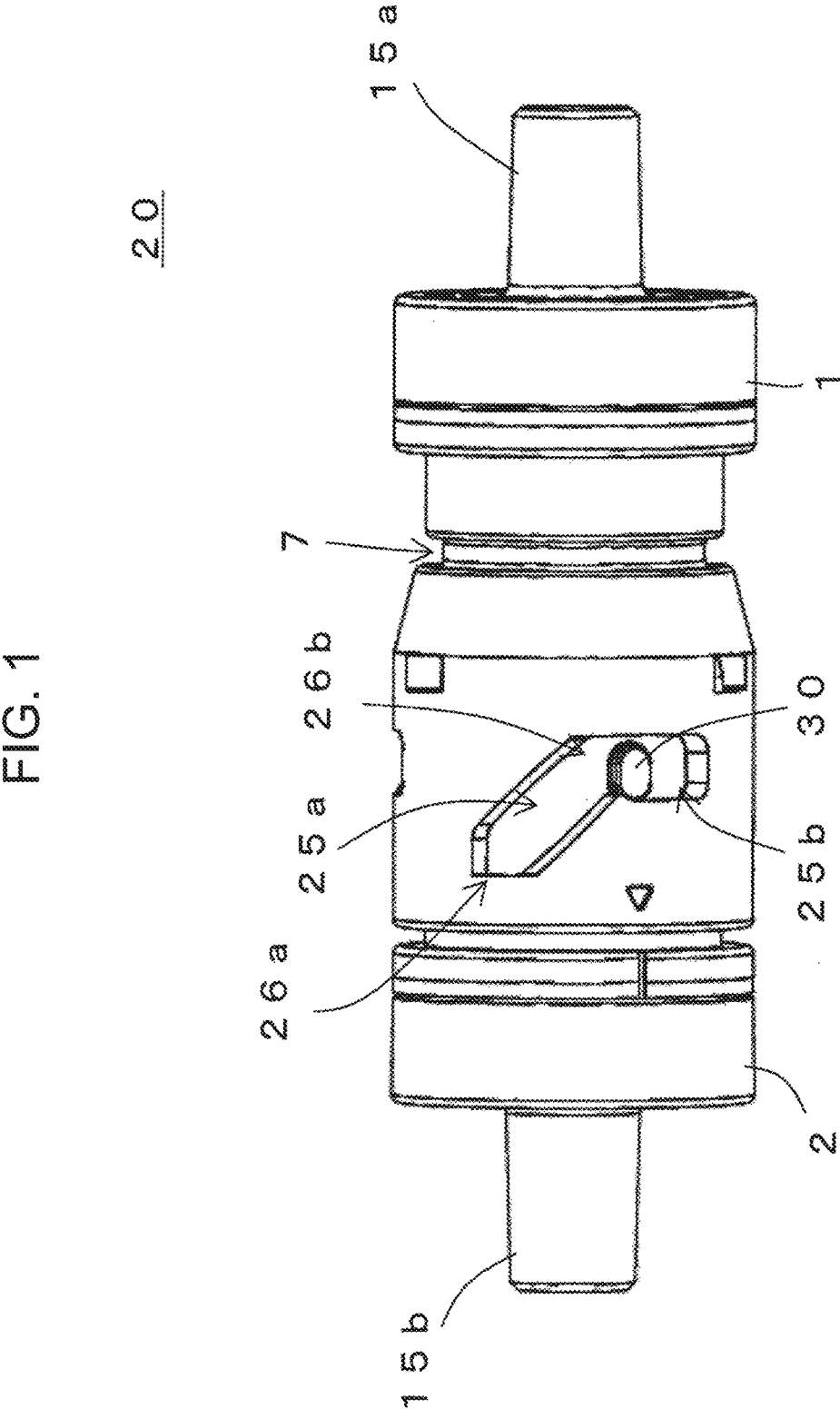
FIG. 1 is a schematic perspective view illustrating an outer appearance of a tube joint according to a first exemplary embodiment, in an opened state where the flow path of the tube joint is opened.

FIG. 1 is a schematic perspective view illustrating an outer appearance of tube joint 20 according to a first exemplary embodiment, in an opened state where a flow path in tube joint 20 is opened. FIG. 2 is a cross-sectional view illustrating the tube joint in FIG. 1 in the opened state where flow path 18 is opened, as viewed from a direction perpendicular to an axial direction.

Tube joint 20 according to the first exemplary embodiment is a tube joint for connecting and coupling two tubes (not illustrated) internals of which are configured to pass a fluid. This tube joint includes: female connector 1 having a first tube 16, the internals of which are configured to pass a fluid, and having an insert receptacle 24 recessed in an axial direction (that is, an insertion direction); and a male connector 2 having a second tube 17, the internals of which are configured to pass the fluid, and having insert 22 projecting and inserted into and connected to insert receptacle 24 in the axial direction. Female connector 1 includes first pressing member 3 having first seal member 8 therearound, first spring 4 having one end connected to insert receptacle 24, first outer peripheral member 19, first spring enclosure 5 that encloses first spring 4, an outer seal member, and annular member 14 that covers outer seal member 6 and first spring enclosure 5 in the axial direction. First outer peripheral member 19 is connected to the other end of first spring 4, is biased outwards in the axial direction, and is in abutment against first seal member 8 disposed around first pressing member 3 while male connector 2 is not inserted in insert receptacle 24. Outer seal member 6 nips, together with first pressing member 3, first outer peripheral member 19 to seal the gap connected to the outside while male connector 2 is not inserted in insert receptacle 24, and seals the gap between female connector 1 and male connector 2 while male connector 2 is inserted in insert receptacle 24. Annular member 14 has recess 7 that is recessed, on the outer side in the radial direction, between outer seal member 6 and first spring enclosure 5 in the axial direction, along at least a part of the circumference of annular member 14.

With the tube joint having the configuration described above, annular member 14 has a recess 7 that is recessed, on the outer side in the radial direction, between outer seal member 6 and first spring enclosure 5, along at least a part of the circumference of the annular member 14. Therefore, even if the volume of the internal fluid containing water expands by freezing, it is possible to suppress an expansion of the part where outer seal member 6 is installed, in the radial direction. In this manner, leakage of the fluid can be suppressed.

Each member making up tube joint 20 will now be described.

<Fluid>

The internal fluid flowing through the tubes included in tube joint 20 is water or a liquid containing water. That is, the internal fluid is a fluid the volume of which expands when the internal fluid becomes frozen at a low temperature.

<Female Connector>

Female connector 1 includes first tube 16, the internals of which are configured to pass the fluid, and insert receptacle 24 that is recessed in the axial direction (X direction), and into and with which insert 22 is inserted and coupled. To tube connector 15a provided to an end, a tube (not illustrated) is connected. The fluid from the tube flows into second tube 17.

<Insert Receptacle>

Insert receptacle 24 has a shape recessed in the axial direction (X direction), and includes first pressing member 3, first seal member 8, and first outer peripheral member 19.

<First Pressing Member>

First pressing member 3 has a shape protruding in the axial direction, and is biased, by first spring 4 in the axial direction when male connector 2 is not inserted in female connector 1. As male connector 2 is inserted into female connector 1, second pressing member 13 of male connector 2 comes into abutment against first pressing member 3 of female connector 1. As illustrated in FIG. 2, first pressing member 3 is positioned on the inner side of insert receptacle 24.

<First Seal Member>

First seal member 8 has an annular shape, and is disposed around first pressing member 3. For example, an O-ring may be used as first seal member 8. First seal member 8 is an example of an inner seal member.

<First Spring>

First spring 4 has one end connected to insert receptacle 24. First spring 4 is disposed around first tube 16.

<First Outer Peripheral Member>

First outer peripheral member 19 is biased in the opposite direction of the axial direction (insertion direction X) by first spring 4. When male connector 2 is separated, first outer peripheral member 19 comes into abutment against first seal member 8, and closes flow path 18 formed between first tube 16 of female connector 1 and second tube 17 of male connector 2. As a result, a closed state is achieved. First outer peripheral member 19 is connected to one end 4a of first spring 4 (see FIG. 2).

By contrast, when first spring 4 is compressed, first outer peripheral member 19 separates from first seal member 8, and opens flow path 18 between first tube 16 and second tube 17. As a result, an opened state is achieved. First outer peripheral member 19 is connected to first pressing member 3 with first spring 4 therebetween. Thus, as second spring 10 is extended or compressed, the relative positions of first outer peripheral member 19 and second pressing member 13 in the axial direction change.

The outer periphery of first outer peripheral member 19 may have a corrugated part (radial outward protrusion), and the inner periphery of annular member 14 may have a corrugated shape (radial outward recess) following the shape of the corrugated part (protrusion) of the first outer peripheral member 19. That is, first outer peripheral member 19 has a corrugated shape (protrusion) on the outer peripheral surface of first outer peripheral member 19. On the inner peripheral surface of annular member 14, annular member 14 has a corrugated shape (recess) following the corrugated shape (protrusion) of first outer peripheral member 19. In this manner, it is possible to reduce the volume between first outer peripheral member 19 and annular member 14, so that it is possible to further suppress the expansion in the radial direction.

<First Spring Enclosure>

First spring enclosure 5 encloses first spring 4, and is defined by first spring 4, first tube 16 that is on the inner peripheral side of first spring 4, and first outer peripheral member 19 that is on the outer peripheral side of the first spring.

<Outer Seal Member>

As illustrated in FIGS. 2 and 4, female connector 1 further includes outer seal member 6 that provides sealing between first outer peripheral member 19 and second outer peripheral member 9, and annular member 14 surrounding the outer periphery of first outer peripheral member 19 and second outer peripheral member 9. Outer seal member 6 is held in abutment against first outer peripheral member 19 or second outer peripheral member 9, while allowing first outer peripheral member 19 and second outer peripheral member 9 to shift in the axial direction. For this purpose, outer seal member 6 has an X-shaped cross-section, for example. Because outer seal member 6 has an X-shaped cross section, and thus comes into contact with first outer peripheral member 19 or second outer peripheral member 9 at two points in the axial direction, less sliding resistance is generated in the axial direction, compared with that with an ordinary seal member having a circular cross section.

Because outer seal member 6 is held in abutment against first outer peripheral member 19 or the second outer peripheral member 9 to provide sealing, even when the position of first outer peripheral member 19 and second outer peripheral member 9 shifts in the axial direction between the closed state and the opened state, it is possible to suppress leakage of the liquid. That is, outer seal member 6 seals the gap between first outer peripheral member 19 and annular member 14 while male connector 2 is not inserted in insert receptacle 24 (opened state).

<Annular Member>

Annular member 14 covers outer seal member 6 and first spring enclosure 5 in the axial direction. Annular member 14 has recess 7 that is recessed on the outer side in the radial direction, between outer seal member 6 and first spring enclosure 5 in the axial direction, along at least a part of the circumference of annular member 14. Recess 7 is recessed in the radial direction of annular member 14 (direction orthogonal to insertion direction X, and extending toward center of annular member 14), from outer surface 14a of annular member 14. Recess 7 is not limited to a recess provided across the entire circumference in the circumferential direction, as illustrated in FIG. 2. For example, as in the case of a tube joint according to a second exemplary embodiment, the recess may have a recess extending across a part in the circumferential direction.

Furthermore, recess 7 may be provided at the same position as one end of first spring enclosure 5 in the axial direction. In such a configuration, the one end is one end while first spring 4 is compressed. The position of recess 7 is not limited to exactly the same position as the one end of first spring enclosure 5, and recess 7 may partially overlap with the one end of first spring enclosure 5. The cross-sectional shape of recess 7 is not limited to the rectangular shape, as illustrated in FIG. 2, and may be any one of a semicircular shape, a V-shape, and a polygonal shape, for example.

Part (a) of FIG. 3 is a schematic cross-sectional view illustrating how first outer peripheral member 19 deforms outwards in the radial direction, when the internal fluid flowing through tube joint 20 illustrated in FIG. 2 freezes and expands in volume, and pushes first outer peripheral member 19 from first spring enclosure 5, and part (b) is a schematic diagram illustrating how an expansion of first spring enclosure 5 in the radial direction is converted into the axial deformation of recess 7. FIG. 4 is an enlarged cross-sectional view illustrating first spring 4, first spring enclosure 5, and recess 7 in the tube joint illustrated in FIG. 2. As illustrated in part (a) of FIG. 3, first spring enclosure 5 communicates with first tube 16. That is, first spring enclosure 5 is configured to allow the fluid flowing inside the first tube 16 to enter first spring enclosure 5.

Recess 7 isolates outer seal member 6, which is a sealing portion, from first spring enclosure 5 where the fluid containing water expands. With this, when first spring enclosure 5 expands, recess 7 deforms in the direction opposite to the axial direction (the direction opposite to the insertion direction X). Specifically, as illustrated in part (a) of FIG. 3, when the internal fluid inside first spring enclosure 5 freezes and expands in volume, first spring enclosure 5 deforms outwards in the radial direction, as indicated by arrow 21. This radially outward deformation 21 is converted into axial deformation 23 of recess 7 of annular member 14, as illustrated in the schematic diagram of FIG. 3(b). With this, the portion where outer seal member 6 is installed, with recess 7 being provided between outer seal member 6 and first spring enclosure 5, does not deform outwards in the radial direction. As a result, outer seal member 6 neither becomes detached outwards in the radial direction, nor cause leakage of the internal fluid.

<Male Connector>

Male connector 2 includes second tube 17 internal of which is configured to pass a fluid, and insert 22 that has a protruding shape protruding in the axial direction (X direction), which is the insertion direction X (see FIG. 2). Male connector 2 also has one end connected to the tube (not illustrated) via tube connector 15b. The fluid from the tube flows into second tube 17.

<Insert>

Insert 22 has a shape protruding in the axial direction (X direction), and includes second pressing member 13, first seal member 8, and second outer peripheral member 9.

<Second Pressing Member>

Second pressing member 13 has a protruding shape protruding in the axial direction, and is biased, by second spring 10, outwards in the axial direction (in the X direction) while male connector 2 is not inserted in female connector 1.

<Second Seal Member>

Second seal member 12 has an annular shape, and is disposed around second pressing member 13. For example, an O-ring may be used.

<Second Outer Peripheral Member>

Second outer peripheral member 9 supports second spring 10 in the axial direction (X direction), and surrounds, in a manner spaced apart from, a circumference of second pressing member 13 in the axial direction (X direction) in an annular shape.

With second pressing member 13 being biased by second spring 10, first outer peripheral member 19 is brought into abutment against second seal member 12, and flow path 18 between first tube 16 of male connector 2 and second tube 17 of female connector 1 is closed. As a result, a closed state is achieved.

By contrast, when second spring 10 is compressed, second outer peripheral member 9 becomes separated from second seal member 12, and opens flow path 18 between first tube 16 and second tube 17. As a result, an opened state is achieved.

Second outer peripheral member 9 is connected to second pressing member 13 with second spring 10 therebetween. Therefore, as second spring 10 is extended or compressed, the relative positions of second outer peripheral member 9 and second pressing member 13 in the axial direction are changed.

<Projection>

Insert 22 may have projection 30 on the peripheral side surface of male connector 2 in the axial direction (X direction). The shape of projection 30 is not limited to a circular shape, and may be a polygonal shape such as a quadrangular shape. Note that, with projection 30 with a curved edge, friction can be alleviated.

<First Through Hole>

As illustrated in FIG. 1, insert receptacle 24 may have first through hole 25a that extends in a direction inclined with respect to the axial direction, and that movably holds projection 30, on a peripheral side surface of female connector 1 in the axial direction (X direction).

With projection 30 guided along first through hole 25a of female connector 1 in the axial direction, male connector 2 is connected to female connector 1.

If a hole extending in the axial direction is provided to female connector 1, male connector 2 needs to be pushed straight in the axial direction without rotating, and therefore, a large force is required. By contrast, because first through hole 25a is provided in a manner inclined with respect to the axial direction, by rotating male connector 2 with a small force, male connector 1 can be easily inserted in the axial direction with the torque. Furthermore, because first through hole 25a is inclined with respect to the axial direction, it is possible to determine the direction in which male connector 2 is to be rotated, when male connector 2 is pushed in the axial direction.

<Second Through Hole>

Insert receptacle 24 may also have second through hole 25b continuous from one axial end 26b of first through hole 25a along an in-plane direction of the side surface, and that extends in the circumferential direction that is substantially perpendicular to the axial direction, on a side surface in a direction intersecting with the axial direction.

With projection 30 then being secured by second through hole 25b in the axial direction, male connector 2 is connected to female connector 1. Furthermore, by providing second through hole 25b across a predetermined length in the circumferential direction, the position of projection 30 in the circumferential direction can be adjusted. With this, twist in the tube resultant of rotation of male connector 2 can be released. Second through hole 25b may form an angle of 20° or more with respect to the axis, for example.

(Closed State)

In the closed state, male connector 2 is inserted in female connector 1; first pressing member 3 and second pressing member 13 is in abutment with each other; first pressing member 3 is biased by first spring 4; and second pressing member 13 is biased by second spring 10. In this configuration, first outer peripheral member 19 is in abutment with first seal member 8, and second outer peripheral member 9 is in abutment with second seal member 12, so that flow path 18 between first tube 16 and second tube 17 is closed thereby.

(Opened State)

By contrast, in the open state, first spring 4 and second spring 10 are compressed, and the relative positions of first pressing member 3 and second pressing member 13 in the X direction with respect to the first outer peripheral member 19 and the second outer peripheral member 9 are shifted to the negative side of the X direction. As a result, first outer peripheral member 19 and second outer peripheral member 9 separate from first seal member 8 and second seal member 12, and flow path 18 between first tube 16 and second tube 17 opens, as indicated by arrows in FIG. 2. In this configuration, the direction of the flow inside flow path 18 is not limited to a direction from first tube 16 toward second tube 17, and may be the reversal that is direction from second tube 17 toward first tube 16. Flow path 18 is defined between first outer peripheral member 19 and second outer peripheral member 9, and first seal member 8 and second seal member 12, on the outer periphery of first pressing member 3 and second pressing member 13.

Second Exemplary Embodiment

FIG. 5 is a schematic perspective view illustrating an outer appearance of tube joint 20a according to a second exemplary embodiment, in an opened state where flow path 18 is opened. FIG. 6 is a cross-sectional view illustrating tube joint 20a in FIG. 5, with flow path 18 in the opened state, as viewed from a direction perpendicular to the axial direction.

Tube joint 20a is different from the tube joint according to the first exemplary embodiment in that recess 7a of annular member 14 does not extend across the entire circumference, and is a recess extending across a part in the circumferential direction. Furthermore, rib 32 dividing recess 7*a* functions as a reinforcing rib, so that, when the recess expands, radial deformation can be suppressed, and converted into an axial deformation.

Furthermore, with this tube joint 20*a*, the outer side of first spring enclosure 5 in the radial direction may be further provided with communicating hole 34 communicating with the inner-periphery side of annular member 14. That is, first outer peripheral member 19 may have communicating hole 34 communicating with the inner-periphery side of annular member 14. This provides an effect of, when tube joint 20*a* is exposed to a low temperature and freezes gradually from the outside, enabling the liquid on the inner-periphery side of annular member 14 to escape inwards.

In this case, by providing rib 32 correspondingly to the position provided with communicating hole 34, the liquid can escape inwards in the portion where communicating hole 34 is provided. Therefore, a less amount of liquid present, so that the effect of suppressing deformation by the rib 32 is further obtained.

Tube joint 20*a* may also be provided with heat insulating material 36 that is disposed on the inner side of first spring enclosure 5 in the radial direction. That is, female connector 1 may further include heat insulating material 36 housed inside first spring enclosure 5 and disposed on the inner side of first spring 4. With this, the liquid on the inner-periphery side is made less likely to freeze even when the liquid freezes gradually from the outside, because of the heat shielding effect of the heat insulating material 36 disposed on the inner side in the radial direction, and, when the liquid in first spring enclosure 5 freezes, the liquid is allowed to escape inwards. As a result, outward expansion in the radial direction can be suppressed. As the heat insulating material 36, a rubber sheet may be used, for example.

The present disclosure includes an appropriate combination of any exemplary embodiment and/or example among the various above-described exemplary embodiments and/or examples, and effects of each of the exemplary embodiments and/or examples can be achieved.

INDUSTRIAL APPLICABILITY

With the tube joint according to the present disclosure, even when the internal fluid containing water freezes and the volume of the internal fluid expands, it is possible to suppress an expansion of the part where the outer seal member is installed, in the radial direction. Therefore, the tube joint is useful as a joint for circulating an internal fluid containing water.

REFERENCE MARKS IN THE DRAWINGS

1: female connector
2: male connector
3: first pressing member
4: first spring
5: first spring enclosure
6: outer seal member
7, 7*a*: recess
8: first seal member
9: second outer peripheral member
10: second spring
11: second spring enclosure
12: second seal member
13: second pressing member

10

14: annular member
15*a*, 15*b*: tube connector
16: first tube
17: second tube
18: flow path
19: first outer peripheral member
20, 20*a*: tube joint
21: radially outward deformation
22: insert
23: axial deformation
24: insert receptacle
25*a*: first through hole
25*b*: second through hole
26*a*: front end
26*b*: axial end
28: outer shell
30: projection
32: rib
34: communicating hole
36: heat insulating material

The invention claimed is:

1. A tube joint for connecting and coupling two tubes having internals configured to pass a fluid therethrough, the tube joint comprising:
a female connector having a first tube having an inner side through which the fluid flows, and having an insert receptacle recessed in an axial insertion direction; and
a male connector including a second tube having an inner side through which the fluid flows, and having an insert protruding in the axial insertion direction and configured to be inserted into the insert receptacle and coupled to the insert receptacle,
wherein the female connector includes:
a pressing member on an inner side of the insert receptacle;
an inner seal member disposed around the pressing member;
a spring disposed around the first tube;
an outer peripheral member connected to a first end of the spring, the outer peripheral member being biased in a direction opposite to the axial insertion direction by the spring, and configured to abut against the inner seal member when the male connector is not inserted in the insert receptacle;
a spring enclosure enclosing the spring;
an outer seal member configured to seal a gap between the female connector and the male connector when the male connector is inserted into the insert receptacle; and
an annular member covering the outer seal member and the spring enclosure,
wherein the outer seal member is configured to seal a gap between the outer peripheral member and the annular member when the male connector is not inserted in the insert receptacle of the female connector,
wherein the annular member has a recess at a position between the outer seal member and the spring enclosure with respect to the axial insertion direction,
wherein the recess is recessed into an outer surface of the annular member in a radial direction of the annular member, and circumferentially extends along at least a part of a circumference of the annular member, and
wherein the recess is configured to deform in a direction opposite to the axial insertion direction when the spring enclosure expands.

2. The tube joint according to claim 1, wherein the recess is located at a same axial position as a first end of the spring enclosure with respect to the axial insertion direction.

3. The tube joint according to claim 1, wherein:

the outer peripheral member has an outer peripheral surface with a radially outward protrusion, and the annular member has an inner peripheral surface with a radially outward recess corresponding to the radially outward protrusion of the outer peripheral member.

4. The tube joint according to claim 1, wherein the outer peripheral member has a communicating hole communicating with an inner peripheral side of the annular member.

5. The tube joint according to claim 1, wherein the female connector further includes a heat insulating material housed in the spring enclosure, and disposed inside the spring.

6. The tube joint according to claim 1, wherein the fluid contains water.

7. The tube joint according to claim 1, wherein the spring enclosure communicates with the first tube.

8. A tube joint for connecting and coupling two tubes having internals configured to pass a fluid therethrough, the tube joint comprising:

a female connector having a first tube having an inner side through which the fluid flows, and having an insert receptacle extending in an insertion direction; and a male connector including a second tube having an inner side through which the fluid flows, and having an insert protruding and configured to be inserted into the insert receptacle and coupled to the insert receptacle, wherein the female connector includes:

a pressing member on an inner side of the insert receptacle;

an inner seal member disposed around the pressing member;

a spring disposed around the first tube;

an outer peripheral member connected to a first end of the spring, the outer peripheral member being biased in a direction opposite to the insertion direction by the spring, and configured to abut against the inner seal member when the male connector is not inserted in the insert receptacle;

a spring enclosure enclosing the spring;

an outer seal member configured to seal a gap between the female connector and the male connector when the male connector is inserted into the insert receptacle; and an annular member covering the outer seal member and the spring enclosure, wherein the outer seal member is configured to seal a gap between the outer peripheral member and the annular member when the male connector is not inserted in the insert receptacle of the female connector, wherein the annular member has a recess at a position between the outer seal member and the spring enclosure with respect to a longitudinal axis of the annular member, wherein the recess is recessed into an outer surface of the annular member in a diameter direction of the annular member and circumferentially extends along at least a part of a circumference of the annular member, and wherein the recess is configured to deform in a direction opposite to the axial insertion direction when the spring enclosure expands.

9. The tube joint according to claim 8, wherein the recess is located at a same axial position as a first end of the spring enclosure with respect to the longitudinal axis.

10. The tube joint according to claim 8, wherein:

the outer peripheral member has an outer peripheral surface with a radially outward protrusion, and the annular member has an inner peripheral surface with a radially outward recess corresponding to the radially outward protrusion of the outer peripheral member.

11. The tube joint according to claim 8, wherein the outer peripheral member has a communicating hole communicating with an inner peripheral side of the annular member.

12. The tube joint according to claim 8, wherein the female connector further includes a heat insulating material housed in the spring enclosure, and disposed inside the spring.

13. The tube joint according to claim 8, wherein the fluid contains water.

14. The tube joint according to claim 8, wherein the spring enclosure communicates with the first tube.

* * * * *